United States Patent [19]

Feutrel

[11] 4,221,636
[45] Sep. 9, 1980

[54] GRIDS FOR BRINGING ABOUT THE SPACING OF A GROUP OF SHEATHED FUEL RODS IN A NUCLEAR REACTOR

[75] Inventor: Claude Feutrel, Vauhallan, France

[73] Assignee: Commissariat a l'Energie Atomique, Paris, France

[21] Appl. No.: 917,593

[22] Filed: Jun. 21, 1978

[30] Foreign Application Priority Data

Jul. 7, 1977 [FR] France .................. 77 20908

[51] Int. Cl.² .................................. G21C 3/02
[52] U.S. Cl. ............................. 176/76; 176/78
[58] Field of Search .......................... 176/76, 78

[56] References Cited

U.S. PATENT DOCUMENTS

| | | | |
|---|---|---|---|
| 3,308,034 | 3/1967 | Schmidt | 176/78 |
| 3,379,617 | 4/1968 | Andrews et al. | 176/76 X |
| 3,431,171 | 3/1969 | Glandin | 176/78 |
| 3,442,763 | 5/1969 | Chetter et al. | 176/78 |
| 3,679,546 | 7/1922 | Muellner et al. | 176/78 |
| 3,791,466 | 2/1974 | Patterson et al. | 176/76 X |
| 3,890,196 | 6/1975 | Chetter | 176/78 |
| 3,892,027 | 7/1975 | Jabsen | 176/78 X |
| 3,904,475 | 9/1975 | Tashima | 176/78 |
| 4,061,536 | 12/1977 | Cregan et al. | 176/78 |
| 4,119,490 | 10/1978 | Delafosse | 176/78 |

Primary Examiner—Peter A. Nelson

[57] ABSTRACT

Spacing grid for a group of fuel rods in a nuclear reactor assembly which comprises an assembly of two groups of thin sheets which are parallel within each group and perpendicular from one group to the next for defining cavities of square cross-section, each of which is traversed by a fuel rod, while substantially in the center of its extension in the region defining two adjacent cavities on either side of the sheet the latter has at least one elastically sprung tongue connected to the sheet and made from a material which differs from that of the sheet, each tongue being bent so as to give a zig-zag profile so that it has at least two bosses bearing respectively against the rods passing through the two cavities, wherein the ends of the tongue are disposed in the plane of the sheet and are engaged in slots provided in the latter in order to hold the tongue in place, while permitting a deflection of its ends as a result of the forces exerted by the rods on the bosses.

11 Claims, 10 Drawing Figures

GRIDS FOR BRINGING ABOUT THE SPACING OF A GROUP OF SHEATHED FUEL RODS IN A NUCLEAR REACTOR

BACKGROUND OF THE INVENTION

The present invention relates to grids for bringing about the spacing of a group of sheathed fuel rods in a nuclear reactor, particularly a water reactor or a vast neutron reactor, said grids serving to maintain the rods parallel to one another and in accordance with a given system, whilst also ensuring the elastic support of said rods in accordance with various successive regions distributed according to their length, particularly for the purpose of preventing vibrations thereof under the action of the circulation of a liquid cooling medium flowing in contact with said rods.

Numerous spacing grid designs of this type are known, being in particular formed by an assembly constituted by two groups of thin perforated sheets which are parallel within each group and perpendicular from one group to the next. These sheets are indented at regular intervals so as to permit their fitting to one another, thus defining cavities with a square cross-section, each of which is traversed by one rod of the group. In order to ensure the necessary elastic support on these rods the sheets are appropriately cut and shaped in such a way as to have towards the inside of each cavity bosses in relief and tongues which form springs, whereby each rod in a cavity is applied to two fixed supports provided on one of the sheets under the action of the sprung tongue provided in the parallel opposite sheet.

In another improved construction in order to combine the advantages of satisfactorily maintaining the elasticity of the tongues under irradiation and a low neutron absorption of the spacing grid the perforated sheets with their fixed supports are made from a slightly absorbing material, for example "Zircaloy" and the sprung tongues from another material, for example "Inconel", the latter being connected to the sheets and immobilised relative thereto by means of appropriate fixing means.

BRIEF SUMMARY OF THE INVENTION

The present invention relates to an improvement made to spacing grids of the type indicated hereinbefore which has the essential advantage of eliminating the presence through the cavities of the grid of fixed supports points for the rods of the group, the latter being held solely by the elastic tongues connected to the sheets of the grid, which in particular ensures a perfect balancing across the grid of the forces exerted on all the rods of the group.

To this end a spacing grid in accordance with the invention comprises an assembly of two groups of thin sheets which are parallel within each group and perpendicular from one group to the next for defining cavities of square cross-section, each of which is traversed by a fuel rod, whilst substantially in the centre of its extension in the region defining two adjacent cavities on either side of the sheet the latter has at least one elastically sprung tongue connected to the sheet and made from a material which differs from that of the sheet, each tongue being bent so as to give a zig-zag profile so that it has at least two bosses bearing respectively against the rods passing through the two cavities, wherein the ends of the tongue are disposed in the plane of the sheet and are engaged in slots provided in the latter in order to hold the tongue in place, whilst permitting a deflection of its ends as a result of the forces exerted by the rods on the bosses.

According to a preferred embodiment of the invention the sprung tongue have two successive bosses, whereby one is placed in each of the two adjacent cavities. As a variant the tongues have three successive bosses, the two end bosses being disposed in one cavity and the third, located between the two first bosses, is located in the adjacent cavity.

According to a special embodiment the ends of each tongue are introduced into the slots made in the sheets in the vicinity of their edges in such a way as to slide against the surface of said sheets, the extreme terminal edges of the tongues being bent so as to form an abutment for the tongues in the absence of forces on the bosses. According to a variant the ends of each tongue engage between the sheet and a parallel shaped border constituting with the sheet an open recess which receives the tongue. According to other variants the ends of each tongue have a head with edges extending perpendicular to the plane of the sheet passing into two parallel slots provided in the latter and are then pressed down against the sheet in its opposite face.

Advantageously the groups of sheets are surrounded by a rigid peripheral frame having teeth in relief which are inclined towards the inside of the frame and provided externally with longitudinal ribs, whereby according to a first variant sleeves are mounted in at least some of the cavities of the grid to permit the passage of longitudinal ties or tubes which brace the fuel assembly.

In this first variant the sheets of the grid of each group are made by means of plates which are perforated in their central portion. According to another variant the sheets comprise two narrow parallel strips disposed in the same plane and interconnected by sleeves. In this case the sheet strips are braced by means of sleeves distributed in certain cavities of the grid, each sleeve having shaped portions forming a projection relative to the outer surface of the sleeves and on which rest the sheet strips. In both variants the sleeves have indented curved edges which are forced down onto the edges of the sheets in order to bring about the immobilisation of said sleeves.

BRIEF DESCRIPTION OF THE DRAWINGS

The invention is described in greater detail hereinafter relative to non-limitative embodiments of the spacing grid according to the invention, with reference to the attached drawings, wherein show.

DETAILED DESCRIPTION OF THE PREFERRED EMBODIMENTS

Figure 1:
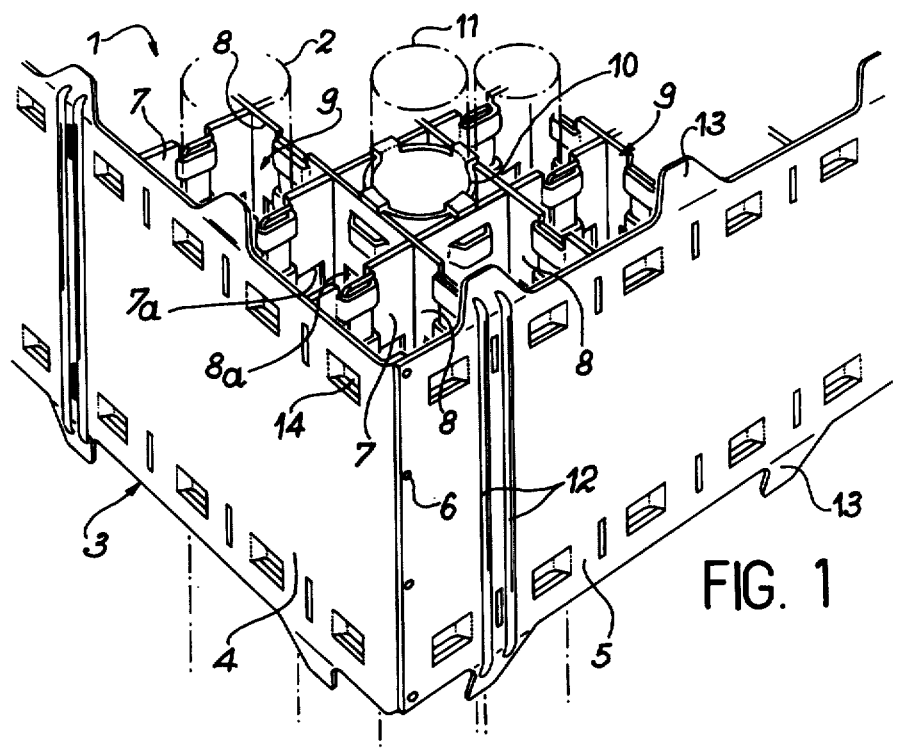
FIG. 1 a partly broken away perspective view of a portion of the grid according to the invention, illustrating more particularly the general construction of said grid and the fitting in the latter of elastic tongues forming bearing springs for the sheathed rods of the assembly.

In the perspective view of FIG. 1 the reference numeral 1 designates in a general manner a fuel assembly for a nuclear reactor, more particularly for a pressurised water reactor, having a group of sheathed rods 2 held at regular intervals along the length of said rods by grids such as that illustrated by reference numeral 3. Grid 3 has an external frame formed from lateral plates 4, 5 joined together by their contacting ends by means of rivets 6 or by any other appropriate means. Within the frame of the grid formed by sides 4 and 5 and two other not shown parallel sides are mounted two groups of transverse sheets 7, 8, which are parallel to one another within the same group and perpendicular to one another from one group to the next, in such a way that they define a series of cavities 9 in which engage the fuel rods 2. Moreover and in accordance with a known arrangement sleeves 10 are passed through certain of these cavities in order to permit the passage through said sleeves of tubes or ties 11, suitably distributed over the system of fuel rods so as to appropriately brace the assembly or, if necessary, to serve as guide tubes for the introduction into the group of rods of control elements (not shown). According to a further known arrangement grid 3 has in the outer surface of plates 4, 5 forming the peripheral frame relief ribs 12 which serve to maintain an appropriate spacing between two adjacent grids in two adjacent assemblies mounted in the core of a nuclear reactor. Finally the upper and lower edges of the grid 3 have profiled teeth 13 which are slightly inclined towards the inside of the grids and which during the engagement of a random fuel assembly in the core prevent the grids of the latter becoming caught on the corresponding grids of already installed adjacent assemblies.

In conventional manner the fuel rods 2 are kept in position on the periphery of grid 3 within cavities 9 by providing on plates 4 or 5 defining the frame fixed supports 14 located in the vicinity of the upper and lower edges of the plates by a stamping or shaping process. Moreover the rods 2 are kept engaged against these fixed supports 14 by means of sprung tongues 15 constructed according to the invention and whose constructional details can be gathered more particularly from FIGS. 2 to 7. These tongues are also provided in all the other cavities of the grid in order to hold the rods in place in a stepwise manner.

As can be gathered more particularly from FIGS. 2 and 2a each sprung tongue 15 is connected to a sheet 7 or 8 of the grid and specifically has two end portions 16, 17 extending into the plane of the corresponding sheet for application to the latter in a manner to be described hereinafter. These end portions 16, 17 are separated by a central portion 18, shaped in such a way that it defines two projecting bosses 19, 20 directed towards two adjacent cavities 9 of the grid, separated by the sheet 7, 8 carrying the corresponding sprung tongue 15.

Figure 2:
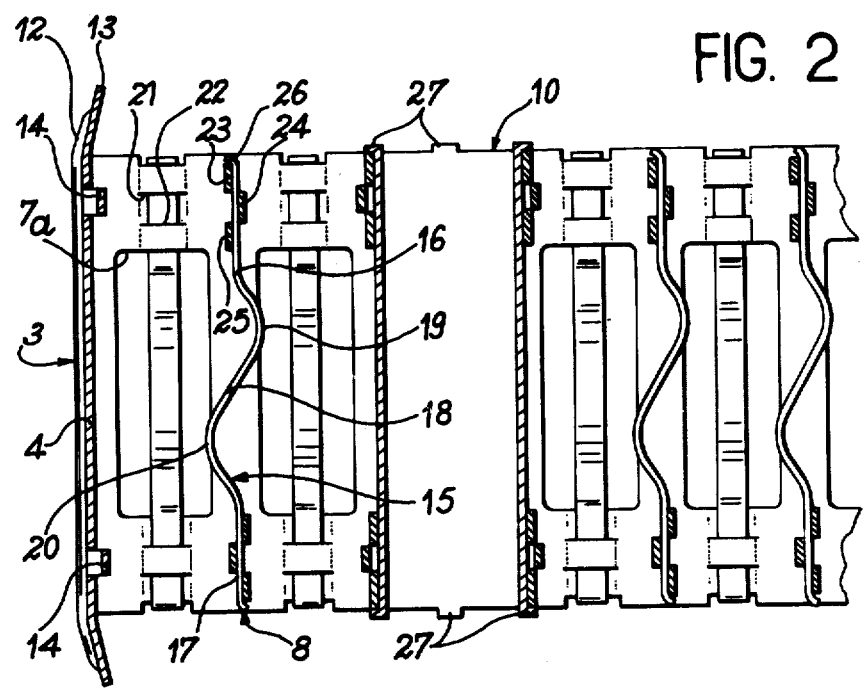
FIG. 2 a larger scale cross-sectional view of the grid of FIG. 1 permitting a better definition of the fitting within the latter of elastic tongues and bracing sleeves.
Figure 2A:
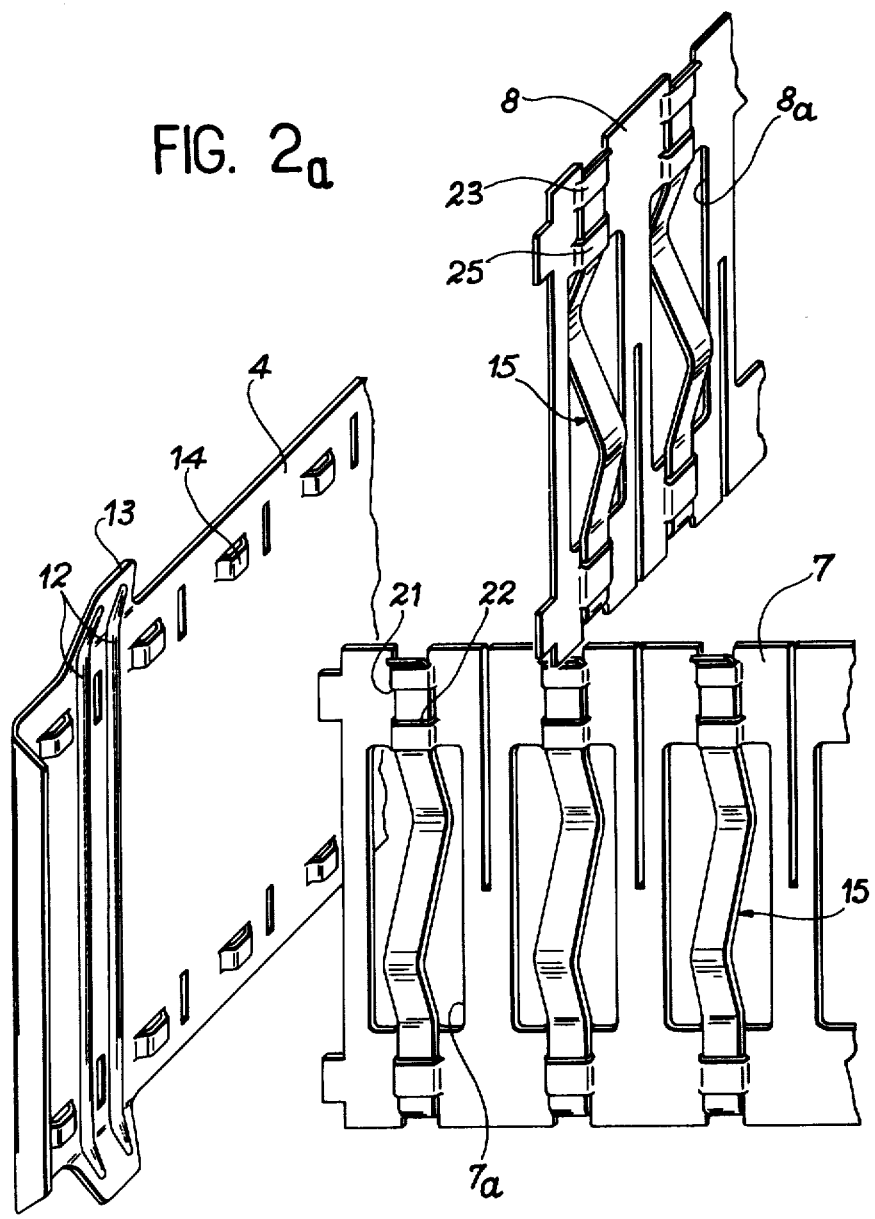
FIG. 2a a partly exploded detailed perspective view of the portion of the grid according to FIG. 2.
Figure 3:
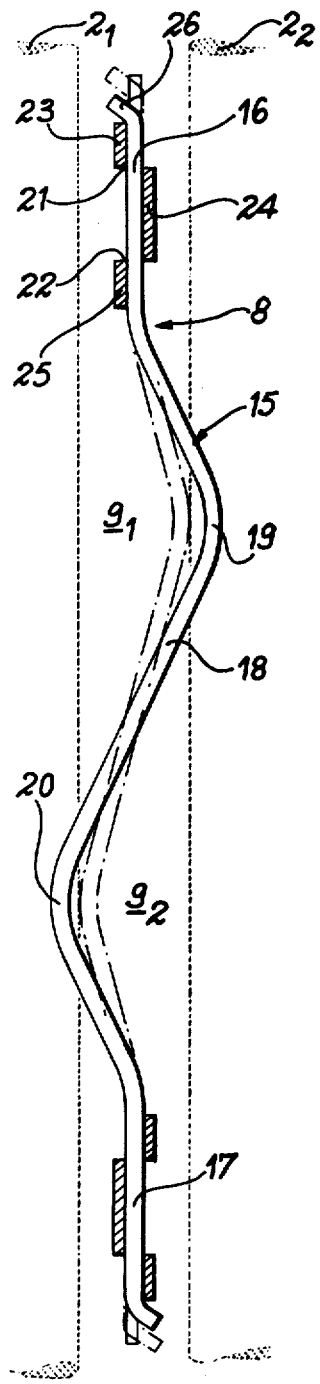
FIG. 3 an even larger scale detailed view of the sprung tongue of the grid.

To ensure that the sprung tongues are maintained against each sheet, for example sheet 7, the latter, more specifically in the embodiment of FIGS. 2 and 3, has two slots 21, 22 in the vicinity of the upper and lower edges of said sheet, the latter having in its central portion wide recesses 7a in order to permit on the one hand the passage of projecting bosses 19, 20 of tongue 15 and on the other the limitation of the quantity of material in sheet 7 to what is absolutely necessary. Thus, slots 21, 22 permit a transverse removal of material from the sheets in order to form three portions 23, 24, 25, the central portion being removed from one side of the tongue and portions 23 and 25 from the other in such a way that end 16 for example of said tongue can engage between them through the slots 21, 22, as can best be seen in FIG. 2. Obviously a similar arrangement is provided in the opposite part of the same sheet in order to permit the engagement of end 17 of tongue 15, the latter being thus maintained in place against the sheet by its two ends. Advantageously ends 16 and 17 of tongue 15 have an extreme terminal edge 26, which is slightly curved and forms an abutment for the tongue by bearing in the manner indicated in FIGS. 2 and 2a against the edge of the sheet, whilst permitting a free deflection by sliding against the plane of the sheet when the tongue is bent towards the inside under the action of the rods engaged in the two relevent adjacent cavities.

FIG. 3 illustrates on a larger scale the details of the above arrangements, whereby the tongue 15 is associated with two fuel rods of the group, namely $2_1$ and $2_2$, engaged in two adjacent cavities $9_1$ and $9_2$. The sprung tongue 15 is shown in solid lines in the position which it occupies when rods $2_1$ and $2_2$ are not engaged in the said cavities and is shown in dot-dash lines when the rods are engaged. It can be seen that the force exerted on projecting bosses 19, 20 by the rods produces an axial deflection of the ends 16, 17, whilst permitting the curved edges 26 of the latter to move freely, respectively towards the top and towards the bottom of the grid if the latter extends horizontally with the vertical fuel rods as is the case when the assembly is fitted in the core of a reactor.

Advantageously and according to a conventional arrangement the sprung tongues can be made from a material which retains a suitable elasticity under irradiation, i.e. during the use of the fuel assembly in the core, an example of such a material being Inconel. However, sheets 7 and 8 of grid 3 are preferably formed from a material having a low neutron absorption, for example Zircaloy.

As a result of the above arrangements and in particular the special installation of the sprung tongues each of the latter involves two adjacent cavities. Except for the cavities located on the periphery of the assembly and in contact by the fixed supports 14 with plates 4 and 5 defining the frame of the grid, each cavity has four independent tongues 15 located along the four sides of said cavity. Thus, there are four elastic support points on each fuel rod 2, excluding any fixed support, in such a way that possible deformations of said elastic tongues may be transmitted stepwise and are suitably balanced through the assembly of the rod system and the grid, whereby the tongues may slide individually and as a function of the forces applied relative to the sheets of the grid in the indicated manner. This not only brings about a balancing of the pressures on the springs, but also a possibility of the double bending of each tongue, by eliminating fixed support points, together with a simplified setting of the springs during their manufacture and assembly.

The cohesion of plates 7 and 8 defining cavities 9 relative to the frame formed by the peripheral plates 4, 5 is ensured by any appropriate fixing means, for example welding or the use of studs (not shown), whose ends connected to plates 4, 5 can be curved and fixed by a welding spot. This cohesion is further reinforced by sleeves 10 placed in certain of the cavities 9 and permitting the passage of tubes or ties 11 of the assembly.

Figure 4:
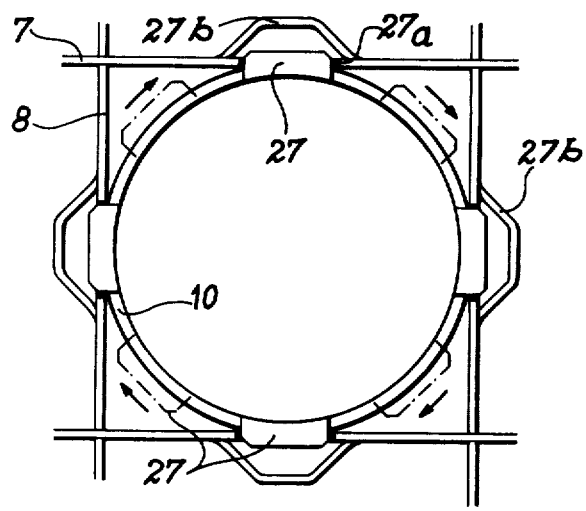
FIG. 4 a plan view of a cavity of the grid according to FIG. 1 having a bracing sleeve and defining the procedure for fitting the latter into the cavity.

FIG. 4 illustrates a detail of said sleeves, having at each of their ends indented and bent down edges 27 which project towards the outside of said sleeves and make it possible to ensure their fixing to the upper and lower edges of sheets 7, 8. Thus, in FIG. 4 it can be seen that once each sleeve 10 is engaged in a cavity 9 with its lowered edges 27 oriented in accordance with the diagonals of the cross-section of said cavity (edges 27 are shown in dot-dash lines in this position) it then undergoes a 45° rotation so that the said edges 27 (shown this time by solid lines) abut against the edges of sheets 7, 8 to which they can be fixed by appropriate welding spots 27a, whilst obviating any subsequent rotation of the sleeves which are definitively immobilised relative to the grid. It should be noted that fixed bosses such as 27b for supporting the corresponding fuel rods are provided in the cavities of the grid surrounding that containing a random sleeve 10 and specifically against the outer faces of the sheets 7, 8 defining said cavity.

Figure 5:
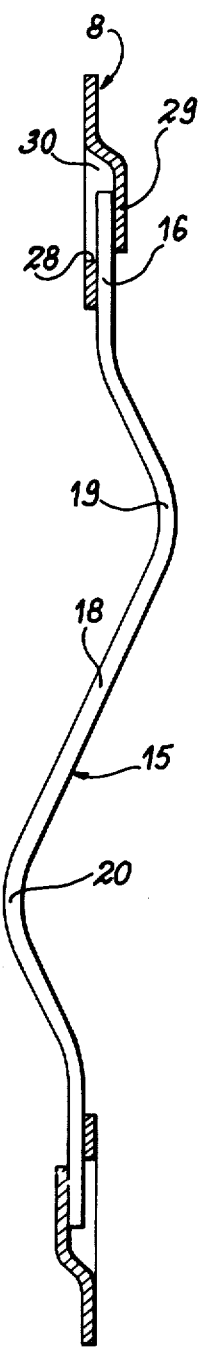
FIGS. 5 and 6 two further variants of the elastic tongue and its fitting in the sheets of the grid.
Figure 6:
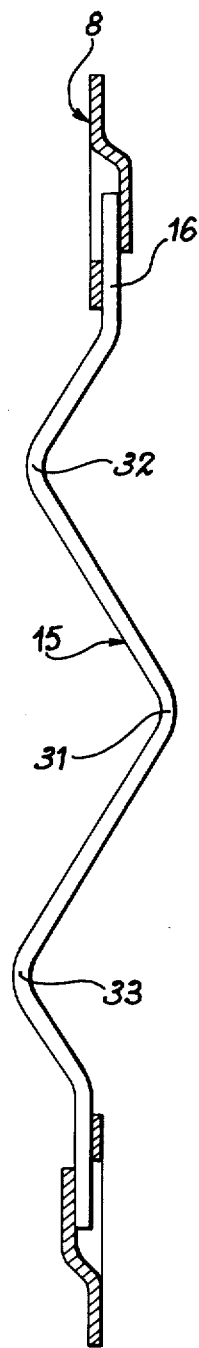

FIGS. 5 and 6 illustrate two other variants of the fitting of each sprung tongue 15 on the one hand and of the shape of said tongues on the other. In FIG. 5 sprung tongue 15 is arranged in such a way that its ends 16, 17 pass through a slot 28 provided in the end of each of the sheets 7, 8 by passing beneath an appropriately shaped flange 29 and thus engaging in a recess 30, whilst leaving an adequate clearance relative to the base of said recess to permit, as in the variant of FIG. 3, an appropriate deflection under the action of the forces exerted on the projecting bosses 19, 20 by the rods 2 mounted in the corresponding cavities.

In the variant illustrated in FIG. 6 the sprung tongue 15, instead of having only two bosses directed respectively towards both the two cavities adjacent to the sheet, has three bosses, whereof the central boss 31 is directed towards one of the cavities and the two lateral bosses 32 and 33 surround the first and are directed towards the adjacent cavity.

Figure 7:
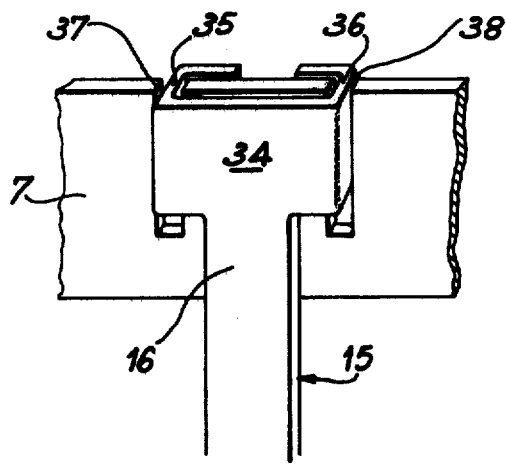
FIGS. 7 and 8 two further variants of the sprung tongues.
Figure 8:
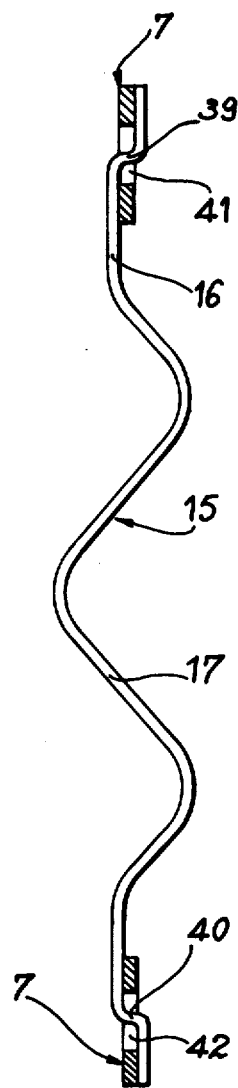

FIGS. 7 and 8 illustrate two further variants of the fitting of sprung tongues 15. In FIG. 7 ends 16 or 17 of each tongue has a head 34, whose lateral sides forms two lugs 35, 36 perpendicular to the plane of sheet 7 or 8 and engage respectively in two parallel slots 37, 38 provided in the upper edge of said sheet. The edges of the lugs are then bent down behind the sheet whilst preventing the sprung tongue from separating from the sheet, whilst leaving it free to act parallel thereto. In FIG. 8 the sprung tongues 15 have at their ends 16, 17 a single inclined edge 39, 40 traversing two corresponding slots 41, 42 in the upper and lower edges of sheets 7, 8 with an appropriate turning down of edge 39, 40 on the face opposite to the corresponding sheet.

Figure 9:
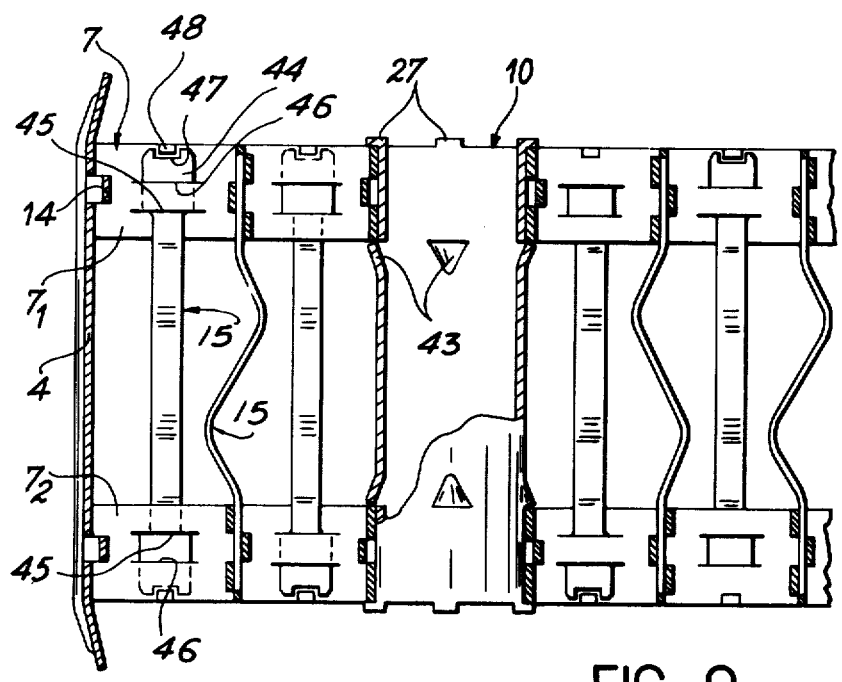
FIG. 9 a part cross-sectional view, identical to FIG. 2 but relating to another constructional embodiment of the grid, more particularly with respect to the sheets defining the cavities of the latter.

In the variant illustrated in FIG. 9 each sheet 7 or 8 comprises two parallel strips or plates $7_1$, $7_2$ for example in the case of sheet 7, separated from one another and disposed in the same plane at the upper and lower ends of the grid. As in the first variant these strips are fixed to plates 4, 5 defining the outer frame. To ensure that said strips $7_1$, $7_2$ are appropriately held in place through the grid assembly it is advantageous to provide on the bracing sleeves 10 lateral members 43 which are open towards the outside and distributed over the periphery of said sleeve in accordance with four zones which are at 90° from one another. Members 43 are provided at two separate levels in such a way that they engage beneath each of the strips $7_1$, $7_2$ ensuring that they are held in place. These strips are also fixed by the lowered edges 27 provided as hereinbefore at the ends of said same sleeves.

In this same variant is also provided another possible form for the elastic tongues 15 forming springs, whose ends 44 are able to slide on the plane of strips $7_1$ and $7_2$, by engaging through slots 45, 46 provided in said strips. In addition, said ends 44 have a recessed zone 47 able to co-operate with a pin 48 joined to the strips to form abutments at the end of their deflection under the action of the forces exerted by the rods mounted in the cavities.

Due to the arrangements according to the present invention and using in particular elastic tongues forming springs joined to the sheets of the grid and bent into a zig-zag configuration in such a way that the bosses of said tongues constitute pairwise support points for the rods mounted in adjacent cavities, a perfect balancing of the bearing reactions on the sheets of the grid is obtained and the latter now only have to compensate the torque due to pressure forces on the rods. This arrangement in particular makes it possible to obtain lines of "floating" rods with respect to the grid with the balancing of all the pressures between them, thus preventing any wear on contact with the sheath, for example as a result of an accidental detachment of a sprung tongue.

On passing each rod into a cavity of the grid the unitary sag of the tongues forming springs is doubled as a result of the elimination of the fixed support points. As a result there is no need for any position regulation of the sprung tongues during fitting. Finally in the variant using two parallel strips to form the sheets of the grid the volume of metal necessary is considerably reduced, which simplifies manufacture and reduces neutron absorption during operation.

The invention is not limited to the embodiments described and represented hereinbefore and various modifications can be made thereto without passing beyond the scope of the invention.

What is claimed is:

1. A spacing grid for a group of fuel rods in a nuclear reactor assembly which comprises an assembly of two groups of thin sheets which are parallel within each group and perpendicular from one group to the next for defining cavities of square cross-section, each of which is traversed by a fuel rod, whilst substantially in the center of its extension in the region defining two adjacent cavities on either side of a sheet the latter has at least one elastically sprung tongue connected to the sheet and made from a material which differs from that of the sheet, each tongue being bent so as to give a zig-zag profile so that it has at least two bosses bearing respectively against the rods passing through the two cavities, wherein the ends of the tongue are disposed in a plane adjacent and parallel with the plane of the sheet and are engaged in slots provided in the latter, said slots being adapted to guide the ends of the tongue according to the length of said tongue, the ends of said tongue being free and adapted to freely slide through said slots when forces are applied to the bosses by the rods.

2. Spacing grid according to claim 1, wherein the sprung tongues have two successive bosses, each located in one of the adjacent cavities.

3. A spacing grid according to claim 1, wherein the tongues have three successive bosses, the two end bosses being disposed in one cavity and the third boss, located between the two first bosses, is disposed in the adjacent cavity.

4. A spacing grid according to claim 1, wherein the ends of each tongue are introduced into the slots made in the sheets in the vicinity of their edges in such a way as to slide against the surface of said sheets, the terminal edges of the tongues being curved so as to form an abutment for the tongues in the absence of forces on the bosses.

5. A spacing grid according to claim 1, wherein the ends of each tongue engage between the sheet and a parallel shaped flange constituting with the sheet an open recess receiving the tongue.

6. A spacing grid according to claim 1, wherein each tongue has a head whose edges extend perpendicular to the plane of the sheet and pass into the two parallel slots made in the latter and are then bent down against the sheet on the opposite face.

7. A spacing grid according to claim 1, wherein each tongue has an inclined terminal edge on the plane of the sheet traversing the latter through a slot and is then bent down against the sheet on the opposite face.

8. A spacing grid according to claim 1, wherein sleeves are mounted in at least some of the cavities of the grid in order to permit the passage of longitudinal bracing tubes or ties for the fuel assembly.

9. A spacing grid according to claim 8, wherein the sheets of the grid are made in each group by means of plates which are perforated in their central portion.

10. A spacing grid according to claim 8, wherein the sheets comprise two narrow parallel strips disposed in the same plane and joined together by sprung tongues, the bracing of the sheet strips being obtained by means of sleeves distributed in certain cavities of the grid, each sleeve having shaped portions which project relative to the outer surface of the sleeves and on which rest the sheet strips.

11. A spacing grid according to claim 9, wherein the sleeves have indented curved edges bent down onto the edges of the sheet in order to ensure the fixing of the said sleeves.

* * * * *